US007065600B2

(12) United States Patent
Papa et al.

(10) Patent No.: US 7,065,600 B2
(45) **Date of Patent: *Jun. 20, 2006**

(54) METHOD OF PROVIDING AN INTERFACE TO A PLURALITY OF PERIPHERAL DEVICES USING BUS ADAPTER CHIPS

(75) Inventors: Stephen E. J. Papa, Santa Cruz, CA (US); Carlton G. Amdahl, Fremont, CA (US); Michael G. Henderson, San Jose, CA (US); Don Agneta, Morgan Hill, CA (US); Don Schiro, San Jose, CA (US); Dennis H. Smith, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 149 days.

This patent is subject to a terminal disclaimer.

(21) Appl. No.: 10/808,220

(22) Filed: Mar. 23, 2004

(65) Prior Publication Data

US 2004/0210701 A1 Oct. 21, 2004

Related U.S. Application Data

(63) Continuation of application No. 10/016,296, filed on Oct. 30, 2001, now Pat. No. 6,742,069, which is a continuation of application No. 08/943,044, filed on Oct. 1, 1997, now Pat. No. 6,324,608.

(60) Provisional application No. 60/047,016, filed on May 13, 1997, provisional application No. 60/047,003, filed on May 13, 1997, provisional application No. 60/046,490, filed on May 13, 1997, provisional application No. 60/046,416, filed on May 13, 1997, provisional application No. 60/046,398, filed on May 13, 1997, provisional application No. 60/046,312, filed on May 13, 1997.

(51) Int. Cl.
*G06F 13/00* (2006.01)
*H05K 5/00* (2006.01)

(52) U.S. Cl. ...................... 710/302; 710/312; 710/314; 361/686; 361/731

(58) Field of Classification Search ..................... None
See application file for complete search history.

(56) References Cited

U.S. PATENT DOCUMENTS 4,057,847 A 11/1977 Lowell et al.

(Continued)

FOREIGN PATENT DOCUMENTS

EP 08 664 03 9/1998

(Continued)

OTHER PUBLICATIONS

NetFrame Clustered Multiprocessing Software: NW0496 DC-ROM for Novel® NetWare® 4.1 SMP, 4.1, and 3.12.

(Continued)

*Primary Examiner*—Glenn A. Auve
(74) *Attorney, Agent, or Firm*—Knobbe Martens Olson & Bear LLP

(57) ABSTRACT

A method of electrically coupling a central processing unit (CPU) of a network server to a plurality of network interface modules. The method comprises providing each of the plurality of network interface modules with a respective bus adapter chip to route an I/O bus having a first format from the central processing unit to a primary side of each of the plurality of bus adaptor chips and routing another I/O bus of the first format from a secondary side of each of the plurality of bus adapter chips to respective ones of the network interface modules. The bus adapter chips also provide for arbitered access along the I/O buses and isolation of the CPU from electrical disruption when one the network interface modules is removed.

17 Claims, 8 Drawing Sheets

U.S. PATENT DOCUMENTS 4,100,597 A 7/1978 Fleming et al.
4,449,182 A 5/1984 Rubinson et al.
4,672,535 A 6/1987 Katzman et al.
4,692,918 A 9/1987 Elliott et al.
4,695,946 A 9/1987 Andreasen et al.
4,707,803 A 11/1987 Anthony, Jr. et al.
4,769,764 A 9/1988 Levanon
4,774,502 A 9/1988 Kimura
4,821,180 A 4/1989 Gerety et al.
4,835,737 A 5/1989 Herrig et al.
4,894,792 A 1/1990 Mitchell et al.
4,949,245 A 8/1990 Martin et al.
4,999,787 A 3/1991 McNally et al.
5,006,961 A 4/1991 Monico
5,007,431 A 4/1991 Donehoo, III
5,033,048 A 7/1991 Pierce et al.
5,051,720 A 9/1991 Kittirutsunetorn
5,073,932 A 12/1991 Yossifor et al.
5,103,391 A 4/1992 Barrett
5,118,970 A 6/1992 Olson et al.
5,121,500 A 6/1992 Arlington et al.
5,123,017 A 6/1992 Simpkins et al.
5,136,708 A 8/1992 Lapourtre et al.
5,136,715 A 8/1992 Hirose et al.
5,138,619 A 8/1992 Fasang et al.
5,157,663 A 10/1992 Major et al.
5,210,855 A 5/1993 Bartol
5,245,615 A 9/1993 Treu
5,247,683 A 9/1993 Holmes et al.
5,253,348 A 10/1993 Scalise
5,261,094 A 11/1993 Everson et al.
5,265,098 A 11/1993 Mattson et al.
5,266,838 A 11/1993 Gerner
5,269,011 A 12/1993 Yanai et al.
5,272,382 A 12/1993 Heald et al.
5,272,584 A 12/1993 Austruy et al.
5,276,814 A 1/1994 Bourke et al.
5,276,863 A 1/1994 Heider
5,277,615 A 1/1994 Hastings et al.
5,280,621 A 1/1994 Barnes et al.
5,283,905 A 2/1994 Saadeh et al.
5,307,354 A 4/1994 Cramer et al.
5,311,397 A 5/1994 Harshberger et al.
5,311,451 A 5/1994 Barrett
5,317,693 A 5/1994 Cuenod et al.
5,329,625 A 7/1994 Kannan et al.
5,337,413 A 8/1994 Lui et al.
5,351,276 A 9/1994 Doll, Jr. et al.
5,367,670 A 11/1994 Ward et al.
5,379,184 A 1/1995 Barraza et al.
5,379,409 A 1/1995 Ishikawa
5,386,567 A 1/1995 Lien et al.
5,388,267 A 2/1995 Chan et al.
5,402,431 A 3/1995 Saadeh et al.
5,404,494 A 4/1995 Garney
5,422,826 A 6/1995 Cousineau
5,423,025 A 6/1995 Goldman et al.
5,430,717 A 7/1995 Fowler et al.
5,430,845 A 7/1995 Rimmer et al.
5,432,715 A 7/1995 Shigematsu et al.
5,432,946 A 7/1995 Allard et al.
5,438,678 A 8/1995 Smith
5,440,748 A 8/1995 Sekine et al.
5,448,723 A 9/1995 Rowett
5,455,933 A 10/1995 Schieve et al.
5,460,441 A 10/1995 Hastings et al.
5,463,766 A 10/1995 Schieve et al.
5,465,349 A 11/1995 Geronimi et al.
5,471,617 A 11/1995 Farrand et al.
5,471,634 A 11/1995 Giorgio et al.
5,473,499 A 12/1995 Weir
5,483,419 A 1/1996 Kaczeus, Sr. et al.
5,485,550 A 1/1996 Dalton
5,485,607 A 1/1996 Lomet et al.
5,487,148 A 1/1996 Komori et al.
5,491,791 A 2/1996 Glowny et al.
5,493,574 A 2/1996 McKinley
5,493,666 A 2/1996 Fitch
5,506,960 A 4/1996 Meare
5,513,314 A 4/1996 Kandasamy et al.
5,513,339 A 4/1996 Agrawal et al.
5,515,515 A 5/1996 Kennedy et al.
5,517,646 A 5/1996 Piccirillo et al.
5,519,851 A 5/1996 Bender et al.
5,526,289 A 6/1996 Dinh et al.
5,528,409 A 6/1996 Cucci et al.
5,530,810 A 6/1996 Bowman
5,533,193 A 7/1996 Roscoe
5,533,198 A 7/1996 Thorson
5,535,326 A 7/1996 Baskey et al.
5,539,883 A 7/1996 Allon et al.
5,542,055 A 7/1996 Amini et al.
5,546,272 A 8/1996 Moss et al.
5,548,712 A 8/1996 Larson et al.
5,555,510 A 9/1996 Verseput et al.
5,559,764 A 9/1996 Chen et al.
5,559,958 A 9/1996 Farrand et al.
5,559,965 A 9/1996 Oztaskin et al.
5,560,022 A 9/1996 Dunstan et al.
5,564,024 A 10/1996 Pemberton
5,566,299 A 10/1996 Billings et al.
5,566,339 A 10/1996 Perholtz et al.
5,568,610 A 10/1996 Brown
5,568,619 A 10/1996 Blackledge et al.
5,572,403 A 11/1996 Mills
5,577,205 A 11/1996 Hwang et al.
5,579,487 A 11/1996 Meyerson et al.
5,579,491 A 11/1996 Jeffries et al.
5,579,528 A 11/1996 Register
5,581,712 A 12/1996 Herrman
5,581,714 A 12/1996 Amini et al.
5,584,030 A 12/1996 Husak et al.
5,586,250 A 12/1996 Carbonneau et al.
5,586,271 A 12/1996 Parrett
5,588,121 A 12/1996 Reddin et al.
5,588,144 A 12/1996 Inoue et al.
5,592,610 A 1/1997 Chittor
5,592,611 A 1/1997 Midgely et al.
5,596,711 A 1/1997 Burckhartt et al.
5,598,407 A 1/1997 Bud et al.
5,602,758 A 2/1997 Lincoln et al.
5,604,673 A 2/1997 Fite et al.
5,606,672 A 2/1997 Wade
5,608,865 A 3/1997 Midgely et al.
5,608,876 A 3/1997 Cohen et al.
5,615,207 A 3/1997 Gephardt et al.
5,621,159 A 4/1997 Brown et al.
5,621,892 A 4/1997 Cook
5,622,221 A 4/1997 Genga, Jr. et al.
5,625,238 A 4/1997 Ady et al.
5,627,962 A 5/1997 Goodrum et al.
5,628,028 A 5/1997 Michelson
5,630,076 A 5/1997 Saulpaugh et al.
5,631,847 A 5/1997 Kikinis
5,632,021 A 5/1997 Jennings et al.
5,636,341 A 6/1997 Matsushita et al.
5,638,289 A 6/1997 Yamada et al.
5,644,470 A 7/1997 Benedict et al.
5,644,731 A 7/1997 Liencres et al.
5,651,006 A 7/1997 Fujino et al.
5,652,832 A 7/1997 Kane et al.
5,652,833 A 7/1997 Takizawa et al.
5,652,839 A 7/1997 Giorgio et al.
5,652,892 A 7/1997 Ugajin

| | | | |
|---|---|---|---|
| 5,652,908 | A | 7/1997 | Douglas et al. |
| 5,655,081 | A | 8/1997 | Bonnell et al. |
| 5,655,083 | A | 8/1997 | Bagley |
| 5,655,148 | A | 8/1997 | Richman et al. |
| 5,659,682 | A | 8/1997 | Devarakonda et al. |
| 5,664,118 | A | 9/1997 | Nishigaki et al. |
| 5,664,119 | A | 9/1997 | Jeffries et al. |
| 5,666,538 | A | 9/1997 | DeNicola |
| 5,668,943 | A | 9/1997 | Attanasio et al. |
| 5,668,992 | A | 9/1997 | Hammer et al. |
| 5,669,009 | A | 9/1997 | Buktenica et al. |
| 5,671,371 | A | 9/1997 | Kondo et al. |
| 5,675,723 | A | 10/1997 | Ekrot et al. |
| 5,680,288 | A | 10/1997 | Carey et al. |
| 5,682,328 | A | 10/1997 | Roeber et al. |
| 5,684,671 | A | 11/1997 | Hobbs et al. |
| 5,689,637 | A | 11/1997 | Johnson et al. |
| 5,696,895 | A | 12/1997 | Hemphill et al. |
| 5,696,899 | A | 12/1997 | Kalwitz |
| 5,696,949 | A | 12/1997 | Young |
| 5,696,970 | A | 12/1997 | Sandage et al. |
| 5,701,417 | A | 12/1997 | Lewis et al. |
| 5,704,031 | A | 12/1997 | Mikami et al. |
| 5,708,775 | A | 1/1998 | Nakamura |
| 5,708,776 | A | 1/1998 | Kikinis |
| 5,712,754 | A | 1/1998 | Sides et al. |
| 5,715,456 | A | 2/1998 | Bennett et al. |
| 5,717,570 | A | 2/1998 | Kikinis |
| 5,721,935 | A | 2/1998 | DeSchepper et al. |
| 5,724,529 | A | 3/1998 | Smith et al. |
| 5,726,506 | A | 3/1998 | Wood |
| 5,727,207 | A | 3/1998 | Gates et al. |
| 5,732,266 | A | 3/1998 | Moore et al. |
| 5,737,708 | A | 4/1998 | Grob et al. |
| 5,737,747 | A | 4/1998 | Vishlitzky et al. |
| 5,740,378 | A | 4/1998 | Rehl et al. |
| 5,742,514 | A | 4/1998 | Bonola |
| 5,742,833 | A | 4/1998 | Dea et al. |
| 5,747,889 | A | 5/1998 | Raynham et al. |
| 5,748,426 | A | 5/1998 | Bedingfield et al. |
| 5,752,164 | A | 5/1998 | Jones |
| 5,754,449 | A | 5/1998 | Hoshal et al. |
| 5,754,797 | A | 5/1998 | Takahashi |
| 5,758,165 | A | 5/1998 | Shuff |
| 5,758,352 | A | 5/1998 | Reynolds et al. |
| 5,761,033 | A | 6/1998 | Wilhelm |
| 5,761,045 | A | 6/1998 | Olson et al. |
| 5,761,085 | A | 6/1998 | Giorgio |
| 5,761,462 | A | 6/1998 | Neal et al. |
| 5,761,707 | A | 6/1998 | Aiken et al. |
| 5,764,924 | A | 6/1998 | Hong |
| 5,764,968 | A | 6/1998 | Ninomiya |
| 5,765,008 | A | 6/1998 | Desai et al. |
| 5,765,198 | A | 6/1998 | McCrocklin et al. |
| 5,767,844 | A | 6/1998 | Stoye |
| 5,768,541 | A | 6/1998 | Pan-Ratzlaff |
| 5,768,542 | A | 6/1998 | Enstrom et al. |
| 5,771,343 | A | 6/1998 | Hafner et al. |
| 5,774,640 | A | 6/1998 | Kurio |
| 5,774,645 | A | 6/1998 | Beaujard et al. |
| 5,774,741 | A | 6/1998 | Choi |
| 5,777,897 | A | 7/1998 | Giorgio |
| 5,778,197 | A | 7/1998 | Dunham |
| 5,781,703 | A | 7/1998 | Desai et al. |
| 5,781,716 | A | 7/1998 | Hemphill et al. |
| 5,781,744 | A | 7/1998 | Johnson et al. |
| 5,781,746 | A | 7/1998 | Fleck |
| 5,781,767 | A | 7/1998 | Inoue et al. |
| 5,781,798 | A | 7/1998 | Beatty et al. |
| 5,784,555 | A | 7/1998 | Stone |
| 5,784,576 | A | 7/1998 | Guthrie et al. |
| 5,787,019 | A | 7/1998 | Knight et al. |
| 5,787,459 | A | 7/1998 | Stallmo et al. |
| 5,787,491 | A | 7/1998 | Merkin et al. |
| 5,790,775 | A | 8/1998 | Marks et al. |
| 5,790,831 | A | 8/1998 | Lin et al. |
| 5,793,948 | A | 8/1998 | Asahi et al. |
| 5,793,987 | A | 8/1998 | Quackenbush et al. |
| 5,794,035 | A | 8/1998 | Golub et al. |
| 5,796,185 | A | 8/1998 | Takata et al. |
| 5,796,580 | A | 8/1998 | Komatsu et al. |
| 5,796,934 | A | 8/1998 | Bhanot et al. |
| 5,796,981 | A | 8/1998 | Abudayyeh et al. |
| 5,797,023 | A | 8/1998 | Berman et al. |
| 5,798,828 | A | 8/1998 | Thomas et al. |
| 5,799,036 | A | 8/1998 | Staples |
| 5,799,196 | A | 8/1998 | Flannery |
| 5,801,921 | A | 9/1998 | Miller |
| 5,802,269 | A | 9/1998 | Poisner et al. |
| 5,802,298 | A | 9/1998 | Imai et al. |
| 5,802,305 | A | 9/1998 | McKaughan et al. |
| 5,802,324 | A | 9/1998 | Wunderlich et al. |
| 5,802,393 | A | 9/1998 | Begun et al. |
| 5,802,552 | A | 9/1998 | Fandrich et al. |
| 5,802,592 | A | 9/1998 | Chess et al. |
| 5,803,357 | A | 9/1998 | Lakin |
| 5,805,804 | A | 9/1998 | Laursen et al. |
| 5,805,834 | A | 9/1998 | McKinley et al. |
| 5,809,224 | A | 9/1998 | Schultz et al. |
| 5,809,256 | A | 9/1998 | Najemy |
| 5,809,287 | A | 9/1998 | Stupek, Jr. et al. |
| 5,809,311 | A | 9/1998 | Jones |
| 5,809,555 | A | 9/1998 | Hobson |
| 5,812,748 | A | 9/1998 | Ohran et al. |
| 5,812,750 | A | 9/1998 | Dev et al. |
| 5,812,757 | A | 9/1998 | Okamoto et al. |
| 5,812,774 | A | 9/1998 | Kempf et al. |
| 5,812,858 | A | 9/1998 | Nookala et al. |
| 5,815,117 | A | 9/1998 | Kolanek |
| 5,815,647 | A | 9/1998 | Buckland et al. |
| 5,815,651 | A | 9/1998 | Litt |
| 5,815,652 | A | 9/1998 | Ote et al. |
| 5,819,054 | A | 10/1998 | Ninomiya et al. |
| 5,821,596 | A | 10/1998 | Miu et al. |
| 5,822,547 | A | 10/1998 | Boesch et al. |
| 5,826,043 | A | 10/1998 | Smith et al. |
| 5,829,046 | A | 10/1998 | Tzelnic et al. |
| 5,835,719 | A | 11/1998 | Gibson et al. |
| 5,835,738 | A | 11/1998 | Blackledge, Jr. et al. |
| 5,838,932 | A | 11/1998 | Alzien |
| 5,841,964 | A | 11/1998 | Yamaguchi |
| 5,841,991 | A | 11/1998 | Russell |
| 5,845,061 | A | 12/1998 | Miyamoto et al. |
| 5,845,095 | A | 12/1998 | Reed et al. |
| 5,850,546 | A | 12/1998 | Kim |
| 5,852,720 | A | 12/1998 | Gready et al. |
| 5,852,724 | A | 12/1998 | Glenn, II et al. |
| 5,857,074 | A | 1/1999 | Johnson |
| 5,857,102 | A | 1/1999 | McChesney et al. |
| 5,864,653 | A | 1/1999 | Tavallaei et al. |
| 5,864,654 | A | 1/1999 | Marchant |
| 5,864,713 | A | 1/1999 | Terry |
| 5,867,730 | A | 2/1999 | Leyda |
| 5,875,307 | A | 2/1999 | Ma et al. |
| 5,875,308 | A | 2/1999 | Egan et al. |
| 5,875,310 | A | 2/1999 | Buckland et al. |
| 5,878,237 | A | 3/1999 | Olarig |
| 5,878,238 | A | 3/1999 | Gan et al. |
| 5,881,311 | A | 3/1999 | Woods |
| 5,884,027 | A | 3/1999 | Garbus et al. |
| 5,884,049 | A | 3/1999 | Atkinson |
| 5,886,424 | A | 3/1999 | Kim |
| 5,889,965 | A | 3/1999 | Wallach et al. |
| 5,892,898 | A | 4/1999 | Fujii et al. |
| 5,892,915 | A | 4/1999 | Duso et al. |
| 5,892,928 | A | 4/1999 | Wallach et al. |

| | | | | |
|---|---|---|---|---|
| 5,893,140 | A | 4/1999 | Vahalia et al. | |
| 5,898,846 | A | 4/1999 | Kelly | |
| 5,898,888 | A | 4/1999 | Guthrie et al. | |
| 5,905,867 | A | 5/1999 | Giorgio | |
| 5,907,672 | A | 5/1999 | Matze et al. | |
| 5,909,568 | A | 6/1999 | Nason | |
| 5,911,779 | A | 6/1999 | Stallmo et al. | |
| 5,913,034 | A | 6/1999 | Malcolm | |
| 5,922,060 | A | 7/1999 | Goodrum | |
| 5,930,358 | A | 7/1999 | Rao | |
| 5,935,262 | A | 8/1999 | Barrett et al. | |
| 5,936,960 | A | 8/1999 | Stewart | |
| 5,937,174 | A | 8/1999 | Weber | |
| 5,938,751 | A | 8/1999 | Tavallaei et al. | |
| 5,941,996 | A | 8/1999 | Smith et al. | |
| 5,964,855 | A | 10/1999 | Bass et al. | |
| 5,967,627 | A | 10/1999 | Rawlings, III | |
| 5,983,349 | A | 11/1999 | Kodama et al. | |
| 5,987,554 | A | 11/1999 | Liu et al. | |
| 5,987,621 | A | 11/1999 | Duso et al. | |
| 6,012,130 | A | 1/2000 | Beyda et al. | |
| 6,038,624 | A | 3/2000 | Chan et al. | |
| 6,170,028 | B1 | 1/2001 | Wallach et al. | |
| 6,173,346 | B1 | 1/2001 | Wallach et al. | |
| 6,179,486 | B1 | 1/2001 | Wallach et al. | |
| 6,189,109 | B1 | 2/2001 | Sheikh et al. | |
| 6,192,434 | B1 | 2/2001 | Wallach et al. | |
| 6,199,137 | B1 | 3/2001 | Aguilar et al. | |
| 6,219,734 | B1 | 4/2001 | Wallach et al. | |
| 6,247,080 | B1 | 6/2001 | Wallach et al. | |
| 6,304,929 | B1 | 10/2001 | Wallach et al. | |
| 6,324,608 | B1 * | 11/2001 | Papa et al. | 710/104 |
| 6,418,539 | B1 | 7/2002 | Walker | |
| 6,742,069 | B1 * | 5/2004 | Papa et al. | 710/302 |

FOREIGN PATENT DOCUMENTS

| | | |
|---|---|---|
| JP | 43 331 18 | 11/1992 |
| JP | 52 331 10 | 9/1993 |
| JP | 70 930 64 | 4/1995 |
| JP | 72 618 74 | 10/1995 |

OTHER PUBLICATIONS

Compaq Computer Corporation, "Where Do I Plug the Cable? Solving the Logical-Physical Slot Numbering Problem", Technology Brief, pp. 1-13, (Dec. 1996).

Davis, T., "Re: How do I create an FDISK batch file?", Usenet post to alt.msdos.programmer, (Apr. 1997).

Davis, T., "Re: Need help with automating FDISK and FORMAT . . . ", Usenet post to alt.msdos.batch, (Apr. 1997).

Lyons, Computer Reseller News, "ACC Releases Low-Cost Solution for ISPs", Issue 721, pp. 61-62, (Feb. 3, 1997).

M2 Communications, "Novell IntranetWare Supports Hot Pluggable PCI from NetFRAME", MS Presswire, 2 pages, (Dec. 19, 1996).

NetFrame Systems Incorporated, Doc. No. 78-1000226-01, pp. 1-2, 5-8, 359-404, and 471-512, (Apr. 1996).

PCI Hot-Plug Specification, Preliminary Revision for Review Only, Revision 0.9, pp. i-vi, and 1-25, (Mar. 5, 1997).

Rigney, "The One for the Road (Mobile-aware capabilities in Windows 95)", PC Magazine, 14(17): 375-379, (Oct. 10, 1995).

SES SCSI-3 Enclosure Services, X3T 10/Project 1212-D/Rev 8a, pp. i, iii-x, 1-76, and I-1 (index), (Jan. 16, 1997).

Shanley and Anderson, PCI System Architecture, Third Edition, Chapters 15 & 16, pp. 297-328, (1995).

Shanley and Andersono, PCI System Architecture, Third Edition, p. 382, (1995).

Sun Microsystems Computer Company, "Solstice SyMON User's Guide", Part No. 802-5355-10, Rev. A, (May 1996).

Sun Microsystems, "Remote Systems Diagnostics Installation & User Guide", Part No. 802-6569-11, Release 1.0.1, (Nov. 1996).

ftp.cdrom.com/pub/os2/diskutil/, PHDX software, phdx.zip download, Mar. 1995, "Parallel Hard Disk Xfer.".

Cmaster, Usenet post to microsoft.public.windowsnt.setup, Aug. 1997, "Re: FDISK switches.".

Hildebrand, N., Usenet post to comp.msdos.programmer, May 1995, "Re: Structure of disk partition into.".

Lewis, L., Usenet post to alt.msdos.batch, Apr. 1997, "Re: Need help with automating FDISK and Format.".

Netframe, http://www.netframe-support.com/technology/datasheets/data.htm, before Mar. 1997, "Netframe ClusterSystem 9008 Data Sheet.".

Simos, M., Usenet post to comp.os.msdos.misc, Apr. 1997, "Re: Auto FDISK and Format.".

Wood, M. H., Usenet post to comp.os.netware.misc, Aug. 1996, "Re: Workstation duplication method for WIN95.".

Stanley, and Anderson, PCI System Architecture, Third Edition, p. 382, Copyright 1995.

Standard Overview, http://www.pc-card.com/stand-overview.html#1, 9 pages, Jun. 1990, "Detailed Overview of the PC Card Standard.".

Digital Equipment Corporation, datasheet, 140 pages, 1993, "DECchip 21050 PCI-TO-PCI Bridge.".

NetFrame Systems Incorporated, News Release, 3 pages, referring to May 9, 1994, "NetFrame's New High-Availability ClusterServer Systems Avoid Scheduled as well as Unscheduled Downtime.".

Compaq Computer Corporation, Phenix Technologies, LTD, and Intel Corporation, specification, 55 pages, May 5, 1985, "Plug & Play BIOS Specification.".

NetFrame Systems Incorporated, datasheet, Feb. 1996, "MF450FT Network Mainframe.".

NetFrame Systems Incorporated, datasheet, Mar. 1996, "NetFrame Cluster Server 8000.".

Joint work by Intel Corporation, Compaq, Adeptec, Hewlett Packard, and Novell, Presentation, 22 pages, Jun. 1996, "Intelligent I/O Architecture.".

Lockareff, M., HTINews, http://www.hometoys.com/htinewsdec96/articles/lonoeworks.htm, Dec. 1996, "Loneworks-An Introduction.".

Schofield, M.J., http://www.omegas.co.uk/CAN/canworks.htm, Copyright 1996, 1997, "Controller Area Network—How CAN Works.".

NRTT, Ltd., http://www.nrtt.demon.co.uk/cantech,html, 5 pages, May 28, 1997, "CAN: Technical Overview.".

Herr, et al., Linear Technology Magazine, Deasign Features, pp. 21-23, Jun. 1997, "Hot Swapping the PCI Bus.".

PCI Special Interest Group, specification, 35 pages, Draft for Review Only, Jun. 15, 1997, "PCI Bus Hot Plug Specification.".

Microsoft Corporation, file:///A_.linevert_split./REM-devs.htm, 4 pages, Copyright 1997, updated Aug. 13, 1997, "Supporting Removable Devices Under Windows and Windows NT.".

Shanley, and Anderson, PCI System Architecture, Third Edition, Chapter 15, pp. 297-302, Copyright 1995, "Intro to Configuration Address Space.".

Shanley, and Anderson, PCI System Architecture, Third Edition, Chapter 16, pp. 303-328, Copyright 1995, "Configuration Transactions.".

Haban, D. & D. Wybranietz, IEEE Transaction on Software Engineering, 16(2):197-211, Feb. 1990, "A Hybrid Monitor for Behavior and Performance Analysis of Distributed Systems." (15 pages) Cited by 27 patents.

Gorlick, M., Conf. Proceedings: ACM/ONR Workshop on Parallel and Distributed Debugging, pp. 175-181, 1991. "The Flight Recorder: An Architectural Aid for System Monitoring." (9 pages) Cited by 49 patents [ISI abstract].

IBM Technical Disclosure Bulletin, 92A+62947, pp. 391-394, Oct. 1992, Method for Card Hot Plug Detection and Control.

NetFrame ClusterSystem 9008 Data Sheet, company product Mar. 1997.

* cited by examiner

METHOD OF PROVIDING AN INTERFACE TO A PLURALITY OF PERIPHERAL DEVICES USING BUS ADAPTER CHIPS

RELATED APPLICATIONS

The present application is a continuation of and claims priority under 35 U.S.C. § 120 to U.S. patent application Ser. No. 10/016,296, filed Oct. 30, 2001, now U.S. Pat. No. 6,742,069, which is a continuation of U.S. patent application Ser. No. 08/943,044, filed on Oct. 1, 1997, now U.S. Pat. No. 6,324,608.

Moreover, the benefit under 35 U.S.C. § 119(e) of the following U.S. provisional applications is hereby claimed:

| Title | Application No. | Filing Date |
|---|---|---|
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |
| "Isolated Interrupt Structure for Input/Output Architecture" | 60/047,003 | May 13, 1997 |
| "Three Bus Server Architecture with a Legacy PCI Bus and Mirrored I/O PCI Buses" | 60/046,490 | May 13, 1997 |
| "Computer System Hardware Infrastructure for Hot Plugging Single and Multi-Function PC Cards Without Embedded Bridges" | 60/046,398 | May 13, 1997 |
| "Computer System Hardware Infrastructure for Hot Plugging Multi-Function PCI Cards With Embedded Bridges" | 60/046,312 | May 13, 1997 |

The subject matter of U.S. Pat. No. 6,175,490 entitled "FAULT TOLERANT COMPUTER SYSTEM", issued on Jan. 16, 2001, is related to this application.

INCORPORATION BY REFERENCE OF COMMONLY OWNED APPLICATIONS

The following patent applications, commonly owned and files Oct. 1, 1997, are hereby incorporated herein in their entirety by reference thereto:

| Title | Application No. | Patent No. | Attorney Docket No. |
|---|---|---|---|
| "System Architecture for Remote Access and Control of Environmental Management" | 08/942,160 | 6,266,721 | MTIPAT.114A |
| "Method of Remote Access and Control of Environmental Management" | 08/942,215 | 6,189,109 | MTIPAT.115A |
| "System for Independent Powering of Diagnostic Processes on a Computer System" | 08/942,410 | 6,202,160 | MTIPAT.116A |
| "Method of Independent Powering of Diagnostic Processes on a Computer System" | 08/942,320 | 6,134,668 | MTIPAT.117A |
| "Diagnostic and Managing Distributed Processor System" | 08/942,402 | 6,338,150 | MTIPAT.118A |
| "Method for Managing a Distributed Processor System" | 08/942,448 | 6,249,885 | MTIPAT.119A |
| "System for Mapping Environmental Resources to Memory for Program Access" | 08/942,222 | 6,122,758 | MTIPAT.120A |
| "Method for Mapping Environmental Resources to Memory for Program Access" | 08/942,214 | 6,199,173 | MTIPAT.121A |
| "Hot Add of Devices Software Architecture" | 08/942,309 | 6,499,073 | MTIPAT.122A |
| "Method for The Hot Add of Devices" | 08/942,306 | 6,247,080 | MTIPAT.126A |
| "Hot Swap of Devices Software Architecture" | 08/942,311 | 6,192,434 | MTIPAT.130A |

-continued

| Title | Application No. | Patent No. | Attorney Docket No. |
|---|---|---|---|
| "Method for The Hot Swap of Devices" | 08/942,457 | 6,304,929 | MTIPAT.123A |
| "Method for the Hot Add of a Network Adapter on a System Including a Dynamically Loaded Adapter Driver" | 08/943,072 | 5,892,928 | MTIPAT.127A |
| "Method for the Hot Add of a Mass Storage Adapter on a System Including a Statically Loaded Adapter Driver" | 08/942,069 | 6,219,734 | MTIPAT.131A |
| "Method for the Hot Add of a Network Adapter on a System Including a Statically Loaded Adapter Driver" | 08/942,465 | 6,202,111 | MTIPAT.124A |
| "Method for the Hot Add of a Mass Storage Adapter on a System Including a Dynamically Loaded Adapter Driver" | 08/962,963 | 6,179,486 | MTIPAT.125A |
| "Method for the Hot Swap of a Network Adapter on a System Including a Dynamically Loaded Adapter Driver" | 08/943,078 | 5,889,965 | MTIPAT.128A |
| "Method for the Hot Swap of a Mass Storage Adapter on a System Including a Statically Loaded Adapter Driver" | 08/942,336 | 6,249,828 | MTIPAT.129A |
| "Method for the Hot Swap of a Network Adapter on a System Including a Statically Loaded Adapter Driver" | 08/942,459 | 6,170,028 | MTIPAT.132A |
| "Method for the Hot Swap of a Mass Storage Adapter on a System Including a Dynamically Loaded Adapter Driver" | 08/942,458 | 6,173,346 | MTIPAT.133A |
| "Method of Performing an Extensive Diagnostic Test in Conjunction with a BIOS Test Routine" | 08/942,463 | 6,035,420 | MTIPAT.155A |
| "Apparatus for Performing an Extensive Diagnostic Test in Conjunction with a BIOS Test Routine" | 08/942,163 | 6,009,541 | MTIPAT.156A |
| "Configuration Management Method for Hot Adding and Hot Replacing Devices" | 08/941,268 | 6,148,355 | MTIPAT.134A |
| "Configuration Management System for Hot Adding and Hot Replacing Devices" | 08/942,408 | 6,243,773 | MTIPAT.135A |
| "Apparatus for Interfacing Buses" | 08/942,382 | 6,182,180 | MTIPAT.136A |
| "Method for Interfacing Buses" | 08/942,413 | 5,987,554 | MTIPAT.137A |
| "Computer Fan Speed Control Device" | 08/942,447 | 5,990,582 | MTIPAT.091A |
| "Computer Fan Speed Control Method" | 08/942,216 | 5,962,933 | MTIPAT.092A |
| "System for Powering Up and Powering Down a Server" | 08/943,076 | 6,122,746 | MTIPAT.089A |
| "Method of Powering Up and Powering Down a Server" | 08/943,077 | 6,163,849 | MTIPAT.090A |
| "System for Resetting a Server" | 08/942,333 | 6,065,053 | MTIPAT.095A |
| "Method of Resetting a Server" | 08/942,405 | 6,330,690 | MTIPAT.096A |
| "System for Displaying Flight Recorder" | 08/942,070 | 6,138,250 | MTIPAT.097A |
| "Method of Displaying Flight Recorder" | 08/942,068 | 6,073,255 | MTIPAT.098A |
| "Synchronous Communication Interface" | 08/943,355 | 6,219,711 | MTIPAT.099A |
| "Synchronous Communication Emulation" | 08/942,004 | 6,068,661 | MTIPAT.100A |
| "Software System Facilitating the Replacement or Insertion of Devices in a Computer System" | 08/942,317 | 6,134,615 | MTIPAT.101A |
| "Method for Facilitating the Replacement or Insertion of Devices in a Computer System" | 08/942,316 | 6,134,614 | MTIPAT.102A |
| "System Management Graphical User Interface" | 08/943,357 | abandoned | MNFRAME.028A |

-continued

| Title | Application No. | Patent No. | Attorney Docket No. |
|---|---|---|---|
| "Display of System Information" | 08/942,195 | 6,046,742 | MTIPAT.103A |
| "Data Management System Supporting Hot Plug Operations on a Computer" | 08/942,129 | 6,105,089 | MTIPAT.138A |
| "Data Management Method Supporting Hot Plug Operations on a Computer" | 08/942,124 | 6,058,445 | MTIPAT.139A |
| "Alert Configurator and Manager" | 08/942,005 | 6,425,000 | MTIPAT.140A |
| "Managing Computer System Alerts" | 08/943,356 | 6,553,416 | MTIPAT.141A |
| "Computer Fan Speed Control System" | 08/940,301 | 6,247,898 | MTIPAT.093A |
| "Computer Fan Speed Control System Method" | 08/941,267 | 6,526,333 | MTIPAT.094A |
| "Black Box Recorder for Information System Events" | 08/942,381 | 6,269,412 | MTIPAT.104A |
| "Method of Recording Information System Events" | 08/942,164 | 6,282,673 | MTIPAT.105A |
| "Method for Automatically Reporting a System Failure in a Server" | 08/942,168 | 6,243,838 | MTIPAT.106A |
| "System for Automatically Reporting a System Failure in a Server" | 08/942,384 | 6,170,067 | MTIPAT.107A |
| "Expansion of PCI Bus Loading Capacity" | 08/942,404 | 6,249,834 | MTIPAT.108A |
| "Method for Expanding PCI Bus Loading Capacity" | 08/942,223 | 6,195,717 | MTIPAT.109A |
| "System for Displaying System Status" | 08/942,347 | 6,145,098 | MTIPAT.142A |
| "Method of Displaying System Status" | 08/942,071 | 6,088,816 | MTIPAT.143A |
| "Fault Tolerant Computer System" | 08/942,194 | 6,175,490 | MTIPAT.144A |
| "Method for Hot Swapping of Network Components" | 08/943,044 | 6,324,608 | MTIPAT.145A |
| "A Method for Communicating a Software Generated Pulse Waveform Between Two Servers in a Network" | 08/942,221 | 6,163,853 | MTIPAT.146A |
| "A System for Communicating a Software Generated Pulse Waveform Between Two Servers in a Network" | 08/942,409 | 6,272,648 | MTIPAT.147A |
| "Method for Clustering Software Applications" | 08/942,318 | 6,134,673 | MTIPAT.149A |
| "System for Clustering Software Applications" | 08/942,411 | 6,363,497 | MTIPAT.148A |
| "Method for Automatically Configuring a Server after Hot Add of a Device" | 08/942,319 | 6,212,585 | MTIPAT.150A |
| "System for Automatically Configuring a Server after Hot Add of a Device" | 08/942,331 | 6,263,387 | MTIPAT.151A |
| "Method of Automatically Configuring and Formatting a Computer System and Installing Software" | 08/942,412 | 6,154,835 | MTIPAT.152A |
| "System for Automatically Configuring and Formatting a Computer System and Installing Software" | 08/941,955 | 6,138,179 | MTIPAT.153A |
| "Determining Slot Numbers in a Computer" | 08/942,462 | 6,269,417 | MTIPAT.154A |
| "System for Detecting Errors in a Network" | 08/942,169 | 6,208,616 | MNFRAME.058A |
| "Method of Detecting Errors in a Network" | 08/940,302 | abandoned | MNFRAME.059A |
| "System for Detecting Network Errors" | 08/942,407 | 6,105,151 | MNFRAME.060A |
| "Method of Detecting Network Errors" | 08/942,573 | 6,134,678 | MNFRAME.061A |

APPENDICES

Appendix A, which forms a part of this disclosure, is a list of commonly owned co-pending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Network servers and the accompanying local area networks (LANs) have expanded the power and increased the productivity of the work force. It was just a few years ago that every work station had a standalone personal computer incapable of communicating with any other computers in the office. Data had to be carried from person to person by diskette. Applications had to be purchased for each standalone personal computer at great expense. Capital intensive hardware such as printers were duplicated for each standalone personal computer. Security and backing up the data were immensely difficult without centralization.

Network servers and their LANs addressed many of these issues. Network servers allow for resource sharing such as sharing equipment, applications, data, and the means for handling data. Centralized backup and security were seen as definite advantages. Furthermore, networks offered new services such as electronic mail. However, it soon became clear that the network servers could have their disadvantages as well.

Centralization, hailed as a solution, developed its own problems. A predicament that might shut down a single standalone personal computer would, in a centralized network, shut down all the networked work stations. Small difficulties easily get magnified with centralization, as is the case with the failure of a network server interface card (NIC), a common dilemma. A NIC may be a card configured for Ethernet, LAN, or Token-Ring to name but a few. These cards fail occasionally requiring examination, repair, or even replacement. Unfortunately, the entire network has to be powered down in order to remove, replace or examine a NIC. Since it is not uncommon for modern network servers to have sixteen or more NICs, the frequency of the problem compounds along with the consequences. When the network server is down, none of the workstations in the office network system will be able to access the centralized data and centralized applications. Moreover, even if only the data or only the application is centralized, a work station will suffer decreased performance.

Frequent down times can be extremely expensive in many ways. When the network server is down, worker productivity comes to a stand still. There is no sharing of data, applications or equipment such as spread sheets, word processors, and printers. Bills cannot go out and orders cannot be entered. Sales and customer service representatives are unable to obtain product information or pull up invoices. Customers browsing or hoping to browse through a network server supported commercial web page are abruptly cut off or are unable to access the web pages. Such frustrations may manifest themselves in the permanent loss of customers, or at the least, in the lowering of consumer opinion with regard to a vendor, a vendor's product, or a vendor's service. Certainly, down time for a vendor's network server will reflect badly upon the vendor's reliability. Furthermore, the vendor will have to pay for more service calls. Rebooting a network server, after all, does require a certain amount of expertise. Overall, whenever the network server has to shut down, it costs the owner both time and money, and each server shut down may have ramifications far into the future. The magnitude of this problem is evidenced by the great cost that owners of network servers are willing to absorb in order to avoid down time through the purchase of uninterruptible power supplies, surge protects, and redundant hard drives.

What is needed to address these problems is an apparatus that can localize and isolate the problem module from the rest of the network server and allow for the removal and replacement of the problem module without powering down the network server.

SUMMARY OF THE INVENTION

The present invention includes methods of removing and replacing data processing circuitry. In one embodiment, the method comprises changing an interface card in a computer comprising removing a network interface module from the computer without powering down the computer and removing an interface card from the network interface module. The further acts of replacing the interface card into the network interface module and replacing the network interface module into the computer without powering down the network computer are also performed in accordance with this method.

Methods of making hot swappable network servers are also provided. For example, one embodiment comprises a method of electrically coupling a central processing unit of a network server to a plurality of network interface modules comprising the acts of routing an I/O bus having a first format from the central processing unit to primary sides of a plurality of bus adaptor chips and routing an I/O bus of the same first format from a secondary side of the bus adaptor chips to respective ones of the network interface modules.

DETAILED DESCRIPTION OF THE INVENTION

Embodiments of the present invention will now be described with reference to the accompanying Figures, wherein like numerals refer to like elements throughout. The terminology used in the description presented herein is intended to be interpreted in its broadest reasonable manner, even though it is being utilized in conjunction with a detailed description of certain specific embodiments of the present invention. This is further emphasized below with respect to some particular terms used herein. Any terminology intended to be interpreted by the reader in any restricted manner will be overtly and specifically defined as such in this specification.

Figure 1:
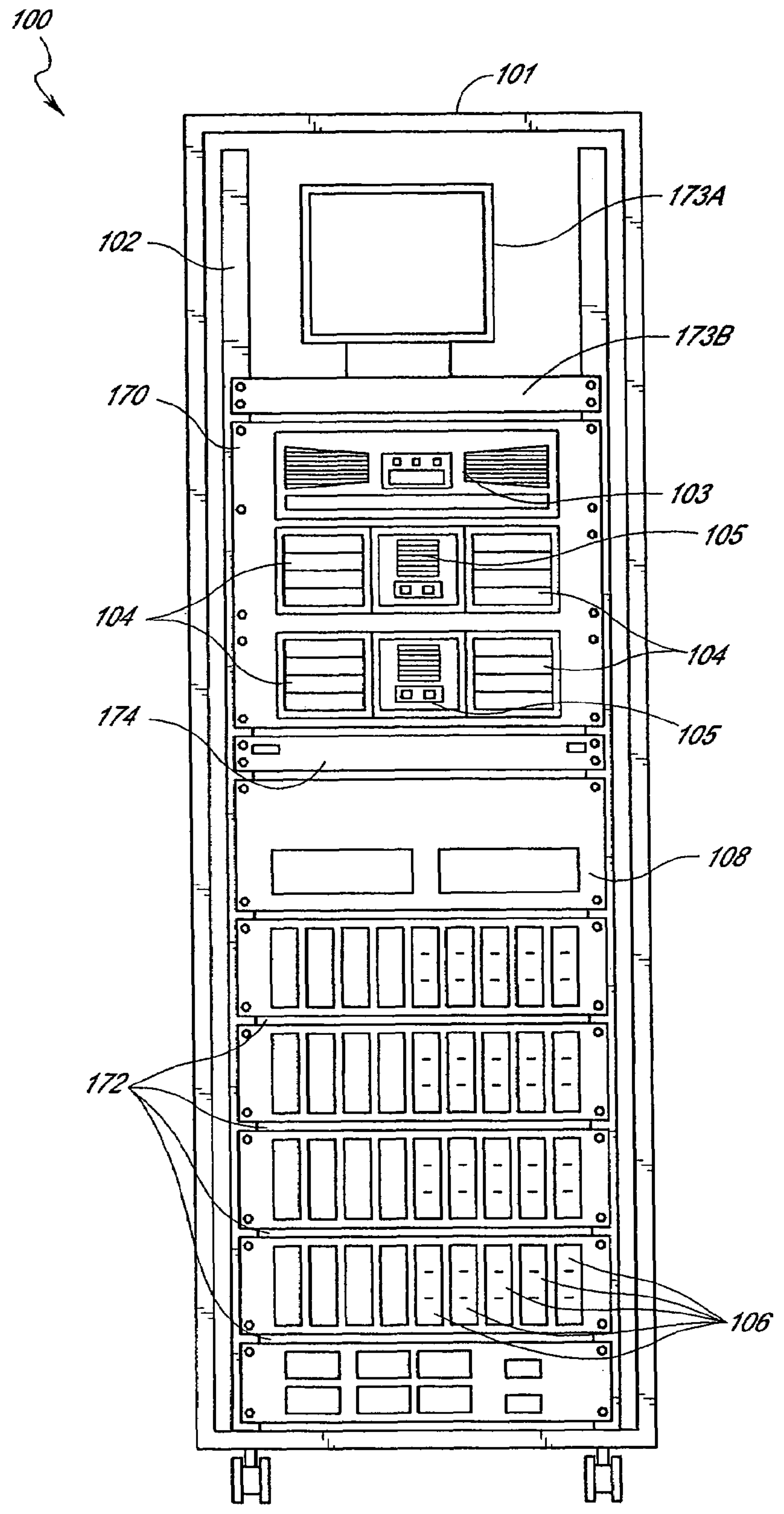
FIG. 1 shows one embodiment of a network server in accordance with the invention including a fault tolerant computer system mounted on a rack.

FIG. 1 shows one embodiment of a network server 100. It will be appreciated that a network server 100 which incorporates the present invention may take many alternative configurations, and may include many optional components currently used by those in the art. A specific example of one such configuration is described in conjunction with FIG. 1. The operation of those portions of the server 100 which are conventional are not described in detail.

In the server of FIG. 1, a cabinet 101 houses a rack 102, on which is mounted several data processing, storage, and display components. The server 100 may include, for example, a display monitor 173A resting on a monitor shelf 173B mounted on the rack 102 as well as a retractable keyboard 174. Also included are a variable number of data storage devices 106, which may be removably mounted onto shelves 172 of the rack 102. One embodiment as shown in FIG. 1 has twenty data storage modules 106 removably mounted individually on four shelves 172 of the rack 102, with five data storage modules 106 per shelf. A data storage module may comprise magnetic, optical, or any other type of data storage media. In the embodiment illustrated in FIG. 1, one data storage module is a CD-ROM module 108.

In advantageous embodiments described in detail with reference to FIGS. 2–6 below, the network server includes a fault tolerant computer system which is mounted in a chassis 170 on the rack 102. To provide previously unavailable ease in maintenance and reliability, the computer system may be constructed in a modular fashion, including a CPU module 103, a plurality of network interface modules 104, and a plurality of power modules 105. Faults in individual modules may be isolated and repaired without disrupting the operation of the remainder of the server 100.

Figure 2:
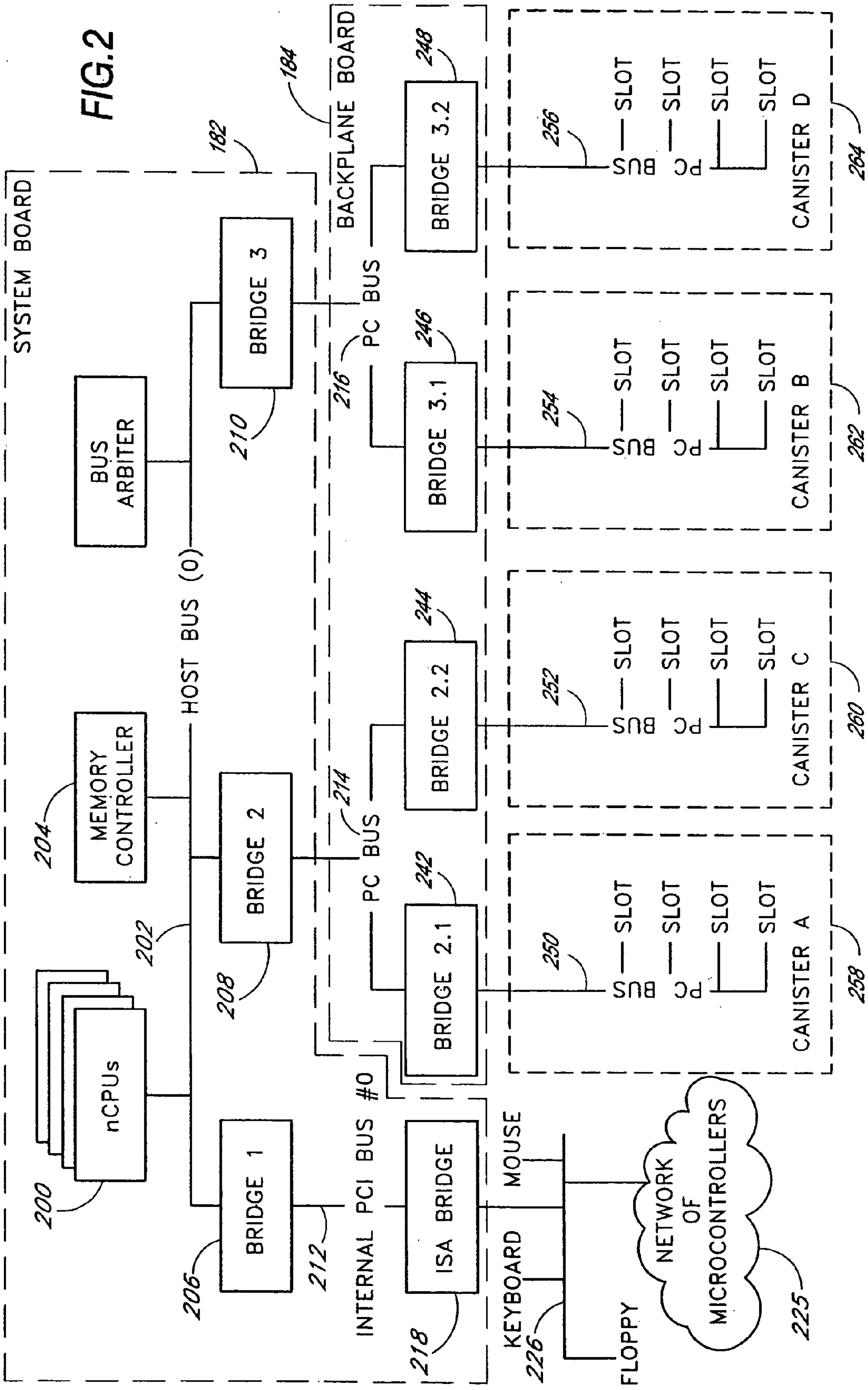
FIG. 2 is a block diagram illustrating certain components and subsystems of the fault tolerant computer system shown in FIG. 1.

Referring now to FIG. 2, a block diagram illustrating several components and subsystems of the fault tolerant computer system is provided. The fault tolerant computer system may comprise a system board 182, a backplane board 184 which is interconnected with the system board 182, and a plurality of canisters 258, 260, 262, and 264 which interconnect with the backplane board 184. A number 'n' of central processing units (CPUs) 200 are connected through a host bus 202 to a memory controller 204, which allows for access to semiconductor memory by the other system components. In one presently preferred embodiment, there are four CPUs 200, each being an Intel Pentium Pro microprocessor. A number of bridges 206, 208 and 210 connect the host bus to three additional bus systems 212, 214, and 216. The bus systems 212, 214 and 216, referred to as PC buses, may be any standards-based bus system such as PCI, ISA, EISA and Microchannel. In one embodiment of the invention, the bus systems 212, 214, 216 are PCI. In another embodiment of the invention a proprietary bus is used.

An ISA Bridge 218 is connected to the bus system 212 to support legacy devices such as a keyboard, one or more floppy disk drives and a mouse. A network of microcontrollers 225 is also interfaced to the ISA bus 226 to monitor and diagnose the environmental health of the fault tolerant system.

The two PC buses 214 and 216 contain bridges 242, 244, 246 and 248 to PC bus systems 250, 252, 254, and 256. As with the PC buses 214 and 216, the PC buses 250, 252, 254 and 256 can be designed according to any type of bus architecture including PCI, ISA, EISA, and Microchannel. The PC buses 250, 252, 254 and 256 are connected, respectively, to a canister 258, 260, 262 and 264. These canisters are casings for a detachable bus system and provide multiple slots for adapters. In the illustrated canister, there are four adapter slots. The mechanical design of the canisters is described in more detail below in conjunction with FIG. 6.

Figure 3A:
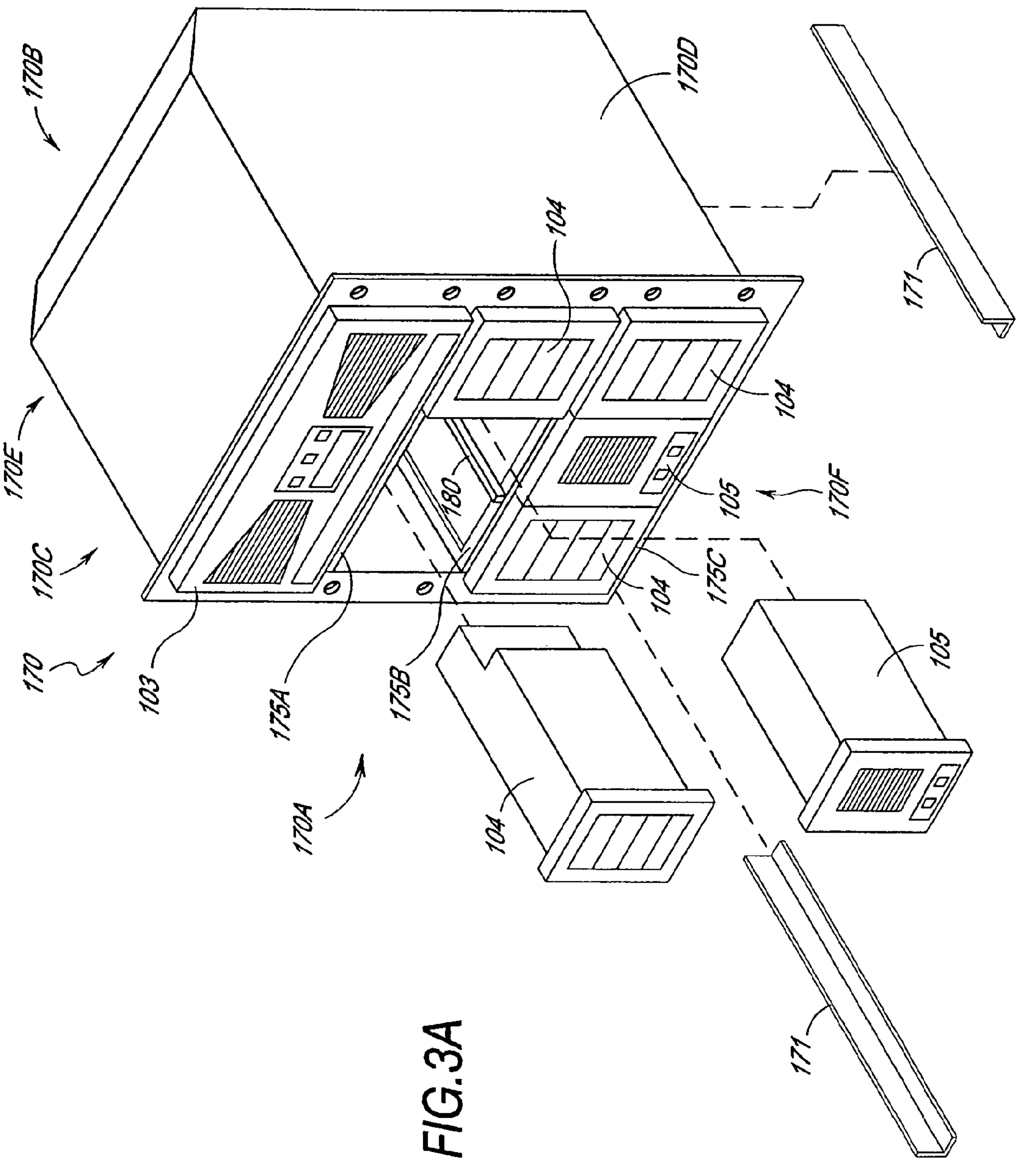
FIG. 3A shows the chassis with network interface modules and power modules.
Figure 3B:
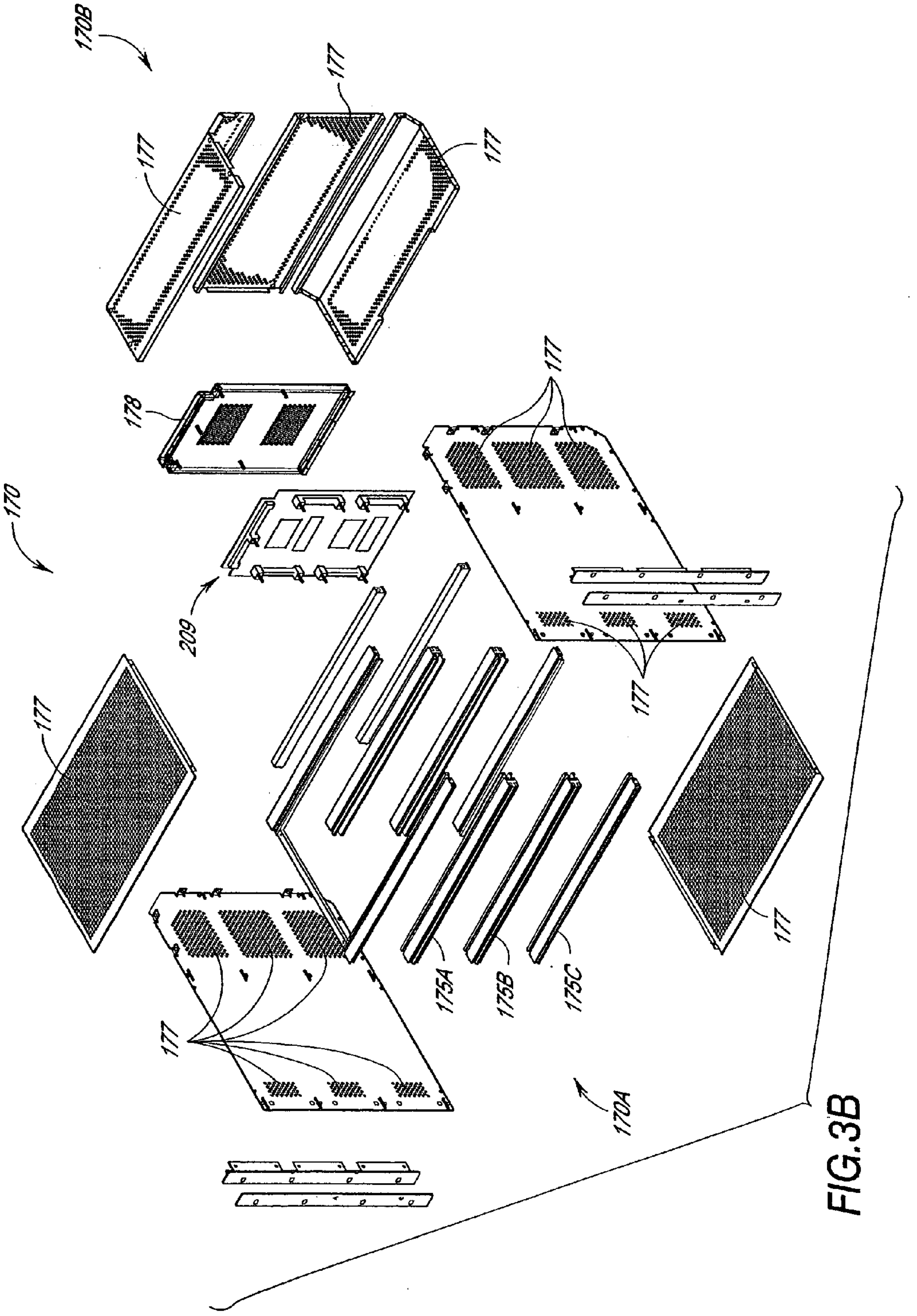
FIG. 3B is an exploded view which shows the chassis and the interconnection assembly module.
Figure 3C:
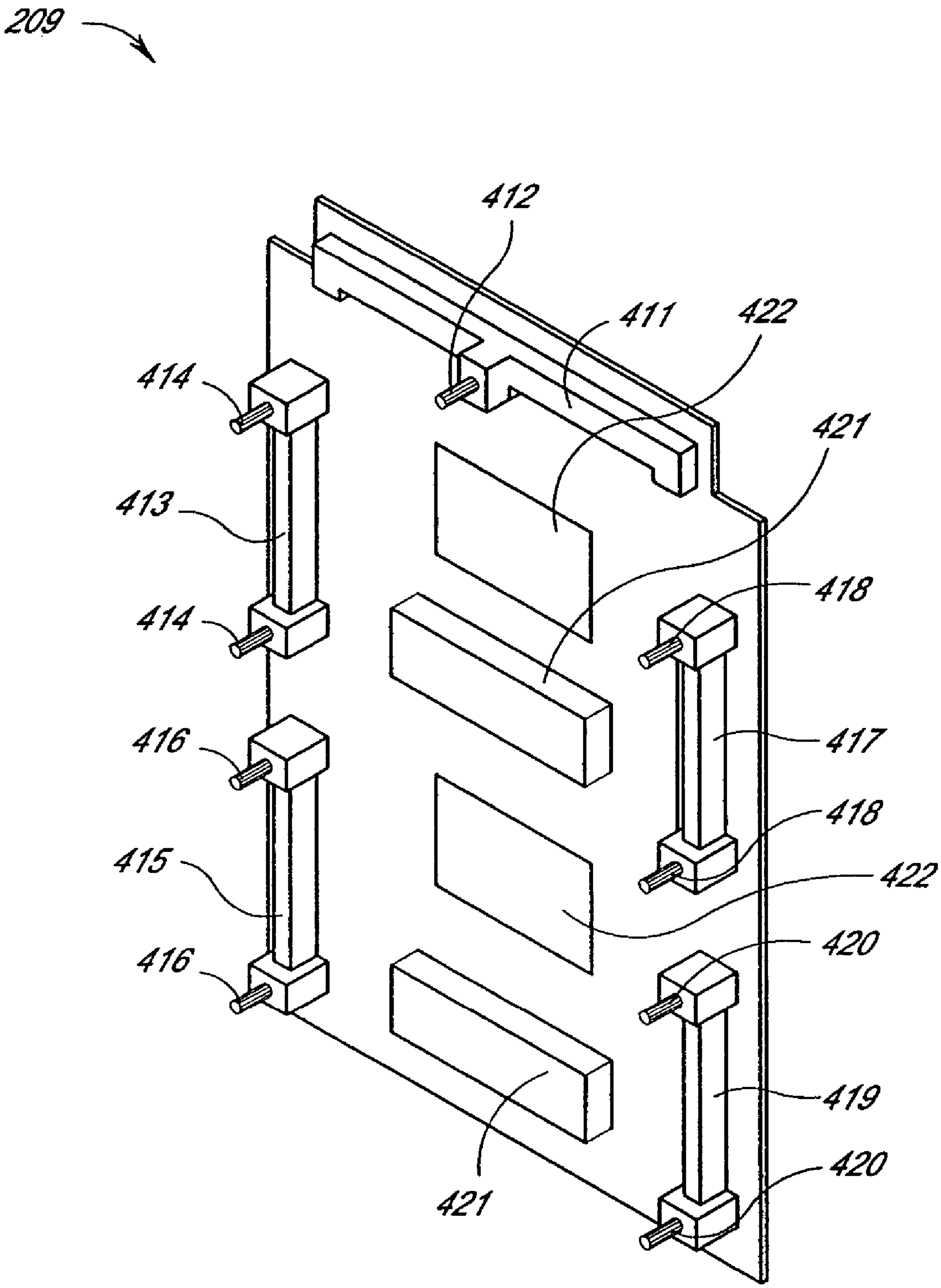
FIG. 3C is an illustration of the interconnection assembly module of FIG. 3B.

The physical arrangement of the components of the fault tolerant computer shown in FIG. 2 are illustrated further in FIGS. 3A, 3B, and 3C. Referring now to FIG. 3A, a chassis 170 is mounted on chassis mounting rails 171 so as to be secured to the rack 102 of FIG. 1. The chassis includes a front 170A, back 170B, sides 170C and 170D, as well as a top 170E and a bottom 170F. Although not shown in FIG. 3A, sets of perforations 177 in such patterns and numbers to provide effective cooling of the internal components of the chassis 170 are also provided in its housing panels.

A central processing unit (CPU) module 103 which may advantageously include the system board 182 of FIG. 2 is removably mounted on a chassis. A plurality of network interface modules 104 are also removably mounted on the chassis 170. The network interface modules 104 may comprise the multiple-slot canisters 258, 260, 262, and 264 of FIG. 2. Two redundant power modules 105 are additionally removably mounted on the chassis 170. The CPU module 103, the network interface modules 104, and the power modules 105, when removably mounted may have their fronts positioned in the same plane as the chassis front 170A.

In this embodiment, the CPU module 103 is removably mounted on the top chassis shelf 175A. The next chassis shelf 175B below holds two removably mounted network interface modules 104 and one removably mounted power module 105. The remaining chassis shelf 175C also holds two removably mounted network interface modules 104 and one removably mounted power module 105. The network interface modules 104 and the power modules 105 are guided into place with the assistance of guide rails such as guide rail 180.

In one embodiment of the invention, the network interface modules 104 and the power modules 105 are connected to the CPU module 103 through an interconnection assembly module 209 (illustrated in additional detail in FIGS. 3B and 3C) which advantageously includes the backplane board 184 illustrated in FIG. 2. The interconnection assembly module electrically terminates and isolates the rest of the network server 100 from the PC Bus local to any given network interface module 104 when that network interface module 104 is removed and replaced without powering down the network server 100 or the CPU module 103. The physical layout of one embodiment of the interconnection assembly module is described in more detail below with reference to FIGS. 5A and 5B.

FIG. 3B illustrates the chassis 170 for the fault tolerant computer system 170 in exploded view. With the interconnection assembly module 209 installed in the rear, interconnection assembly module 209 may provide a communication path between the CPU module 103 and the network interface modules 104. In this embodiment, the interconnection assembly module 209 is mounted on the chassis back 170B such that it is directly behind and mates with the chassis modules 103, 104 and 105 when they are mounted on the chassis 170.

Thus, with the interconnection assembly module 209 mounted on the chassis 170, the network interface modules 104 can be brought in and out of connection with the network server 100 by engaging and disengaging the network interface module 104 to and from its associated backplane board connector. One embodiment of these connectors is described in additional detail with reference to FIG. 3C below. This task may be performed without having to power down the entire network server 100 or the CPU module 103. The network interface modules 104 are thus hot swappable in that they may be removed and replaced without powering down the entire network server 100 or the CPU module 103.

In FIG. 3C, a specific connector configuration for the interconnection assembly module 209 is illustrated. As is shown in that Figure, four connectors 413, 415, 417, and 419 are provided for coupling to respective connectors of the network interface modules 104. Two connectors 421 are provided for the power modules 105. Another connector 411 is configured to couple with the CPU module 103. The process of interconnecting the network interface modules 104 and the CPU module 103 to the interconnection assembly module 209 is facilitated by guiding pegs 412, 414, 416, 418, 420 on the connectors of the interconnection assembly module 209 which fit in corresponding guiding holes in the network interface modules 104 and CPU module 103. The interconnection assembly module 209 also includes two sets of perforations 422 sufficient in number and in such patterns so as to assist with the cooling of each power module 105. This embodiment has two sets of perforations 422 adjacent each power module connector 421.

Figure 4:
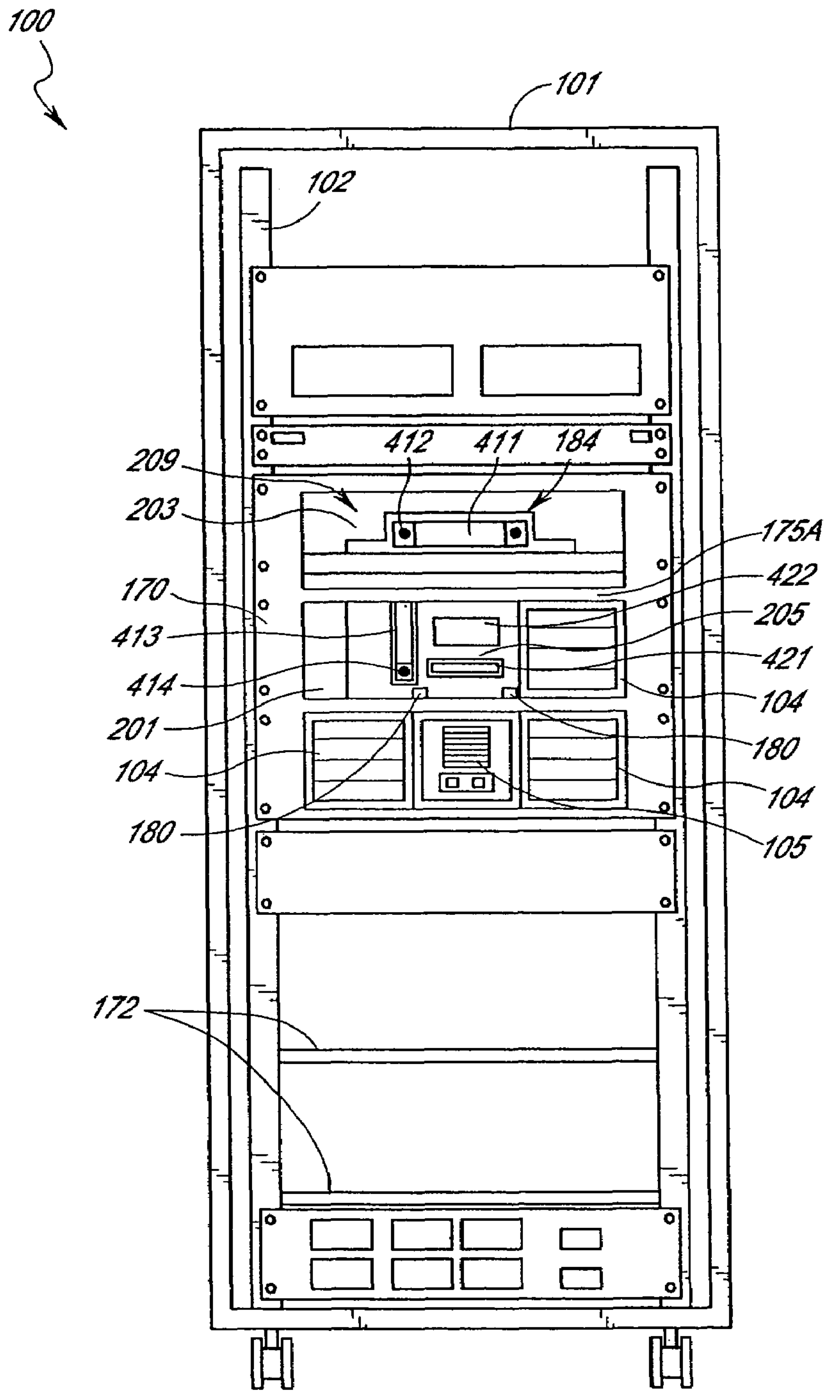
FIG. 4 shows a front view of an embodiment of a network server in a chassis mounted on a rack.

FIG. 4 is a front view of the network server cabinet 101 housing a partially assembled fault tolerant computer system mounted on a rack 102. In this Figure, the interconnection assembly module 209 is visible through unoccupied module receiving spaces 201, 203, and 205. The CPU module 103 has not yet been mounted on the chassis as evidenced by the empty CPU module space 203. As is also illustrated in FIG. 1, several network interface modules 104 are present. However, one of the network interface modules remains uninstalled as evidenced by the empty network interface module space 201. Similarly, one power module 105 is present, but the other power module has yet to be installed on the chassis 170 as evidenced by the empty power module space 205.

In this Figure, the front of the interconnection assembly module 209 mounted on the rear of the chassis is partially in view. FIG. 4 thus illustrates in a front view several of the connectors on the backplane board 184 used for connecting with the various chassis modules when the chassis modules are removably mounted on the chassis 170. As also described above, the CPU module 103 may be removably mounted on the top shelf 175A of the chassis in the empty CPU module space 203. As briefly explained above with reference to FIGS. 3A through 3C, the CPU module 103 has a high density connector which is connected to the high density connector 411 on the back of the backplane printed circuit board 184 when the CPU module is mounted on the top shelf 175A of the chassis 170. The chassis 170 and the guiding peg 412 assist in creating a successful connection between the 360 pin female connector 411 and the 360 male connector of the CPU module 103. The guiding peg 412 protrudes from the backplane printed circuit board front and slip into corresponding guiding holes in the CPU module 103 when the CPU module 103 is mounted on the shelf 175A of the chassis 170.

In addition, one of the high density connectors 413 which interconnects the backplane printed circuit board 184 with one of the network interface modules 104 is shown in FIG. 4. In the illustrated embodiments, there are four high density connectors, one connecting to each network interface module 104. The high density connector 413 may be a 180 pin female connector. This 180 pin female connector 413 connects to a 180 pin male connector of the network interface module 104 when the network interface module 104 is removably mounted on the middle shelf 175B of the chassis in the empty network interface module space 201. The chassis, the two guiding pegs (of which only guiding peg 414 is shown in FIG. 4), and the chassis guide rail 180 assist in creating a successful connection between the 180 pin female connector 413 and the 180 pin male connector of the network interface module 104. The two guiding pegs, of which only guiding peg 414 is within view, protrude from the front of the backplane printed circuit board and slip into corresponding guiding holes in the network interface module 104 when the network interface module 104 is removably mounted on a shelf of the chassis.

Figure 5B:
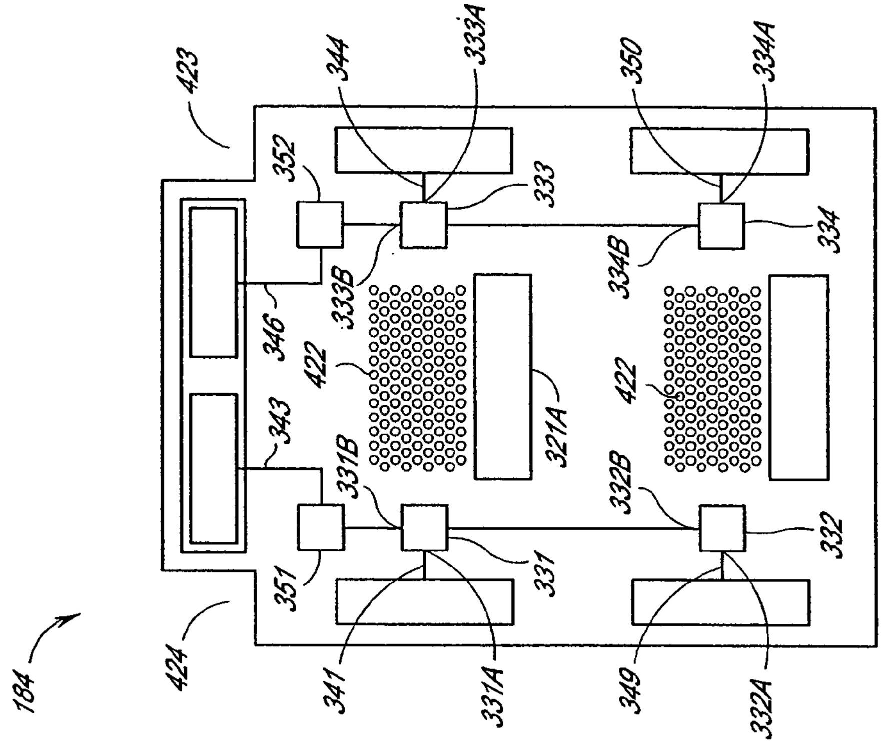
FIG. 5B is a view showing the back of the backplane printed circuit board of the interconnection assembly module in the network server.
Figure 5A:
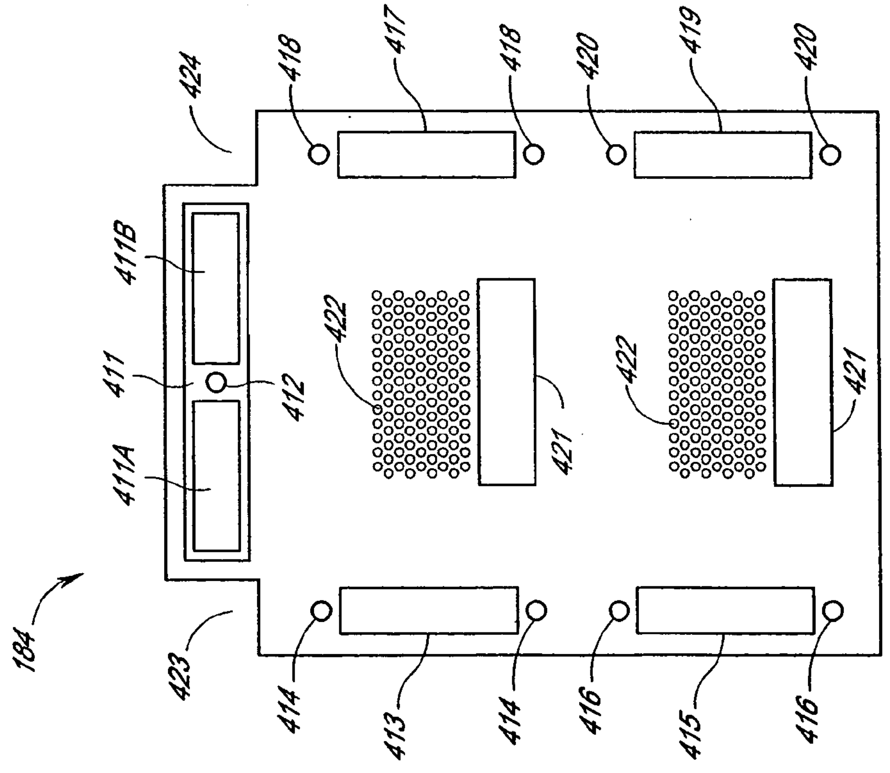
FIG. 5A is a view showing the front of the backplane printed circuit board of an interconnection assembly module in the network server.

FIG. 5A is a view showing the front side of the backplane printed circuit board 184. In this embodiment, the backplane printed circuit board 184 is configured to be mounted on the chassis rear directly behind the chassis modules comprising the CPU module 103, the network interface modules 104, and the power modules 105. The backplane printed circuit board 184 may be rectangularly shaped with two rectangular notches 423 and 424 at the top left and right.

As is also shown in FIG. 3C, the backplane printed circuit board 184 also has high density connectors 413, 415, 417 and 419 which connect to corresponding network interface modules 104. Each high density connector has a pair of guiding pegs 414, 416, 418, and 420 which fit into corresponding guiding holes in each network interface module 104. The backplane printed circuit board also mounts a high density connector 411 and a guiding peg 412 for connecting with the CPU module 103 and two connectors 421 for connecting with the power modules 105. The backplane printed circuit board 184 may also include sets of perforations 422 sufficient in number and in such patterns so as to assist with the cooling of each power module 105. The perforations 422 are positioned in the backplane printed circuit board 184 directly behind the power modules 105 when the power modules 105 are removably mounted on the shelves 175B and 175C of the chassis.

FIG. 5B shows the rear side of the backplane printed circuit board 184. The back of the connectors 421 that connect to the connectors of the power modules 105 are illustrated. Also, the rear of the high density connectors 413, 415, 417 and 419 which connect to the network interface modules 104 are also present on the backplane printed circuit board back to connect to the backplane printed circuitry. As shown in this Figure, each high density connector 413, 415, 417, 419 is attached to an input/output (I/O) bus 341, 344, 349 or 350. In one advantageous embodiment, the I/O bus is a peripheral component interconnect (PCI) bus.

In one embodiment of the present invention, the I/O buses 341, 344, 349, and 350 are isolated by bus adapter chips 331, 332, 333 and 334. These bus adapter chips 331, 332, 333, and 334 provide, among other services, arbitered access and speed matching along the I/O bus. One possible embodiment uses the DEC 21152 Bridge chip as the bus adapter 331, 332, 333 or 334.

Several advantages of the present invention are provided by the bus adapter chips 331 through 334 as they may be configured to provide electrical termination and isolation when the corresponding network interface module 104 has been removed from its shelf on the chassis. Thus, in this embodiment, the bridge 331, 332, 333 or 334 acts as a terminator so that the removal and replacement of a network interface module 104 from its shelf of the chassis 170, through an electrical removal and insertion is not an electrical disruption on the primary side of the bridge chip 331, 332, 333 or 334. It is the primary side of the bridge chip 331B, 332B, 333B or 334B which ultimately leads to the CPU module 103. Thus, the bridge chip 331, 332, 333 or 334 provides isolation for upstream electrical circuitry on the backplane printed circuit board 184 and ultimately for the CPU module 103 through an arbitration and I/O controller chip 351 or 352. As mentioned above, this embodiment uses a PCI bus for the I/O bus. In such an instance, the bridge chip is a PCI to PCI bridge. The arbitration and I/O controller chip 351 or 352 (not illustrated in FIG. 2 above) determines arbitered access of the I/O bus and I/O interrupt routing. The I/O bus 343 or 346 then continues from the arbitration and I/O controller chip 351 or 352 to the back side of the high density connector 411 that connects with the corresponding high density connector of the CPU module 103 when the CPU module 103 is mounted on the top shelf 175A of the chassis 170.

Figure 6:
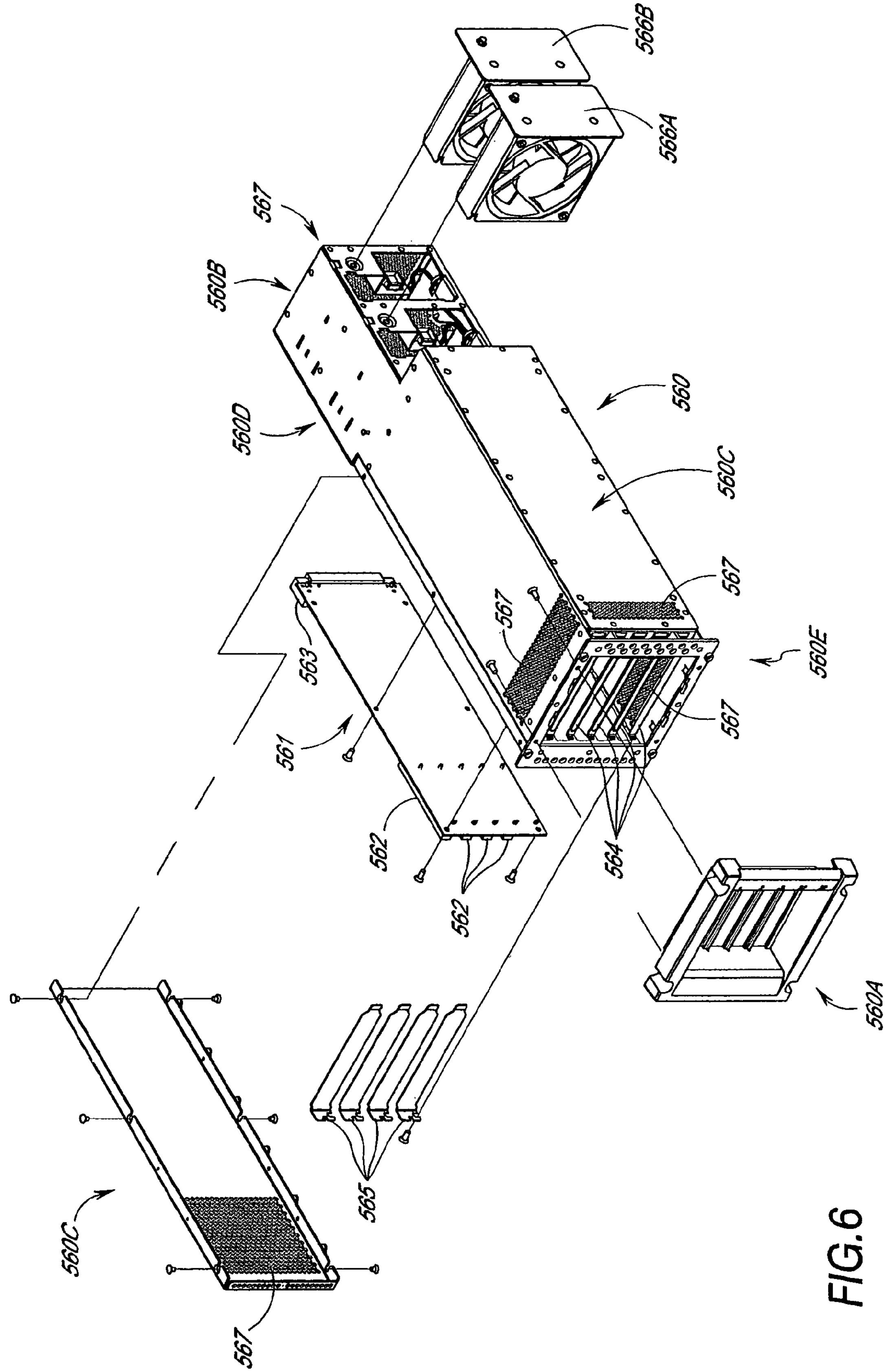
FIG. 6 is an exploded view which shows the elements of one embodiment of a network interface module of the network server.

FIG. 6 shows aspects of one embodiment of a network interface module 104. The modularity provided by the canister configuration provides ease of maintenance. Referring now to this Figure, the network interface module 104 comprises a canister 560 with a front 560A, back 560B, sides 560C, top 560D and bottom 560E. The canister front 560A may be positioned proximate the front of the chassis when the canister is removably mounted on a shelf of the chassis. A printed circuit board 561 is secured flat against the canister side 560C inside the canister 560. The printed circuit board 561 comprises an I/O bus. As described above, in one advantageous embodiment, the I/O bus is a PCI bus. A plurality of interface card slots 562, are attached to the I/O bus. The number of allowed interface card slots is determined by the maximum load the I/O bus can handle. In the illustrated embodiment, four interface card slots 562 are provided, although more or less could alternatively be used. Also connected to the I/O bus and on one end of the printed circuit board 561 is a high density connector 563 which mates with one of the high density connectors on the backplane board 184. Above and below the connector 563 is a solid molding with a guiding hole. These two guiding holes correspond with a pair of guiding pegs 414, 416, 418, or 420 which along with the chassis and the chassis guiding rails assist, when the canister 560 is removably mounted, in bringing together or mating the 180 pin male connector 563 at one end of the printed circuit board 561 and the 180 pin female connector 413, 415, 417 or 419 on the backplane printed circuit board 184.

Interface cards may be slipped into or removed from the interface card slots 562 when the canister 560 is removed from its shelf 175B or 175C in the chassis 170. An interface card slot 562 be empty or may be filled with a general interface card. The general interface card may be a network interface card (NIC) such as, but not limited to, an Ethernet card or other local area network (LAN) card, with a corresponding NIC cable connected to the NIC and routed from the server 100 to a LAN. The general interface card may be a small computer system interface (SCSI) controller card with a corresponding SCSI controller card cable connected to the SCSI controller card. In this embodiment, the SCSI controller card is connected by a corresponding SCSI controller card cable to a data storage module which may be connected to data storage modules such as hard disks 106 or other data storage device. Furthermore, the general interface card need not be a NIC or an SCSI controller card, but may be some other compatible controller card. The canister front 560A also has bay windows 564 from which the general interface card cable may attach to a general interface card. Unused bay windows may be closed off with bay window covers 565.

The network interface module 104 also has a novel cooling system. Each network interface module 104 extends beyond the chassis rear, and in this portion, may include a pair of separately removable fans 566A and 566B. The separately removable fans are positioned in series with one separately removable fan 566B behind the other separately removable fan 566A. The pair of separately removable fans 566A and 566B run at reduced power and reduced speed unless one of the separately removable fans 566A or 566B fails, in which case, the remaining working separately removable fan 566B or 566A will run at increased power and increased speed to compensate for the failed separately removable fan 566A or 566B. The placement of the separately removable fans 566A and 566B beyond the chassis rear make them readily accessible from the behind the rack 102. Accessibility is desirable since the separately removable fans 566A and 566B may be removed and replaced without powering down or removing the network interface module 104.

To further assist with the cooling of the canister 560, the canister 560 has sufficient sets of perforations 567 in such pattern to assist in cooling the canister 560. In this embodiment, the perforations 567 are holes in the canister 560 placed in the pattern of roughly a rectangular region.

A significant advantage of this embodiment is the ability to change a general interface card in a network server 100 without powering down the network server 100 or the CPU module 103. To change a general interface card, it is desirable to first identify the bridge chip 331, 332, 333 or 334 whose secondary side is connected to the network interface module 104 containing the general interface card to be changed.

Assuming that the general interface card that needs to be changed is in the network interface module 104 which is connected by PCI bus and high density connector to bridge chip 331, to remove the network interface module 104 without disrupting operation of the other portions of the server 100, the bridge chip 331 may become an electrical termination to isolate the electrical hardware of the network server from the electrical removal or insertion on the bridge chip secondary side 331A. This may be accomplished by having the CPU module 103 place the secondary side 331A, 332A, 333A or 334A of the bridge into a reset mode and having circuitry on the printed circuit board 561 of the network interface module 104 power down the canister 560 including the general interface cards within the canister 560. Once the canister 560 is powered down and the bridge chip has electrically isolated the network interface module from the rest of the electrical hardware in the network server 100, then the network interface module 104 may be pulled out its shelf 175B in the chassis 170. After the network interface module 104 has been removed, then the general interface card can be removed from its interface card slot 562 and replaced. Subsequently, the network interface module 104 is removably mounted again on the shelf 175B in the chassis 170. The electrical hardware on the printed circuit board 561 of the network interface module 104 may then power up the canister 560 including the general interface cards within the canister 560. The bridge chip secondary side 331A, 332A, 333A or 334A is brought out of reset by the CPU module 103 and the network interface module 104 is again functional.

At no time during the procedure did the network server 100 or the CPU module 103 have to be powered down. Although the one network interface module 104 was powered down during the procedure, the other network interface modules were still functioning normally. In fact, any workstation connected to the network server 100 by means other than the affected network interface module 104 would still have total access to the CPU module 103, the other network interface modules, and all the networks and data storage modules such as, but not limited to hard disks, CD-ROM modules, or other data storage devices that do not rely upon the general interface cards inside the removed network interface module. This is a desired advantage since network server down time can be very costly to customers and to vendors, can create poor customer opinion of the vendor, vendor's products and services, and decrease overall computing throughput.

The foregoing description details certain embodiments of the present invention and describes the best mode contemplated. It will be appreciated, however, that no matter how detailed the foregoing appears in text, the invention can be practiced in many ways. As is also stated above, it should be noted that the use of particular terminology when describing certain features or aspects of the present invention should not be taken to imply that the broadest reasonable meaning of such terminology is not intended, or that the terminology is being re-defined herein to be restricted to including any specific characteristics of the features or aspects of the invention with which that terminology is associated. The scope of the present invention should therefore be construed in accordance with the appended claims and any equivalents thereof.

What is claimed is:

1. A method of electrically coupling a central processing unit (CPU) of a server to a plurality of interface modules comprising:

routing an I/O bus having a first format from said central processing unit to primary sides of a plurality of bus adapter chips; and routing an I/O bus of said first format from secondary sides of said bus adapter chips to respective ones of said interface modules, wherein routing the I/O buses to and from bus adapter chips comprises electrically isolating the central processing unit from electrical disruption when one of the interface modules is removed.

2. The method of claim 1, wherein the bus adapter chips comprise electrical hardware which provides arbitered access along the I/O busses.

3. The method of claim 1, further including mounting a plurality of interface cards in interface card slots in said plurality of interface modules.

4. The method of claim 1, further including removably mounting said interface modules on a chassis.

5. The method of claim 4, wherein removably mounting the interface module comprises mounting said interface module such that said interface module may be removed from said chassis and disconnected electrically from said CPU or mounted on said chassis and connected electrically to said CPU without powering down said CPU.

6. A method of electrically coupling a plurality of interface modules to a CPU such that at least one of the interface modules can be disconnected without powering down the remaining interface modules or the CPU, said method comprising:

mounting a CPU on a chassis;

removably mounting a plurality of interface modules to said chassis;

mounting a backplane printed circuit board on the chassis, wherein the backplane printed circuit board comprises at least one bus adapter chip for each of the plurality of interface modules, and wherein each bus adapter chip has a primary side and a secondary side, and wherein each bus adapter chip has electrical hardware that isolates the primary side from the secondary side when the corresponding interface module has been removed from the chassis;

routing an I/O bus on said backplane printed circuit board from the primary side of the at least one bus adapter chip to the CPU; and routing an I/O bus on said backplane printed circuit board from the secondary side of the at least one bus adapter chip to the corresponding one of the interface modules.

7. The method of claim 6, wherein the I/O busses comprise peripheral component interconnect (PCI) busses.

8. The method of claim 7, wherein said act of mounting the plurality of interface modules to the backplane printed circuit board comprises the acts of:

connecting a 180 pin female connector on said backplane printed circuit board with a 180 pin male connector on a interface module of said plurality of interface modules; and connecting a 360 pin female connector on said backplane printed circuit board with a 360 pin male connector on said CPU.

9. The method of claim 6, further including mounting a plurality of interface cards in interface card slots in said plurality of interface modules.

10. The method of claim 9, wherein said printed circuit board powers down said interface modules including said interface cards thereon.

11. A method of electrically coupling a plurality of interface modules to a CPU such that at least one of the interface modules can be removed without powering down the remaining interface modules or the CPU, said method comprising:

mounting a backplane printed circuit board on the back of a chassis;

connecting a CPU module to said backplane printed circuit board when mounting a CPU module on said chassis; and removably mounting a plurality of interface modules to the backplane printed circuit board; and connecting the plurality of interface modules to the backplane printed circuit board with bus adapter chips configured to provide electrical termination and isolation between the interface modules and the CPU module when a interface module is removed.

12. The method of claim 11, where said act of connecting said interface module to said backplane printed circuit board comprises the act of connecting a high density connector of said interface module to a high density connector on said backplane printed circuit board.

13. The method of claim 12, further including mounting a plurality of interface cards in interface card slots in said plurality of interface modules.

14. A system for electrically coupling a central processing unit (CPU) of a server to a plurality of interface modules, the system comprising:

first means routing an I/O bus having a first format from said central processing unit to primary sides of a plurality of bus adapter chips; and second means for routing an I/O bus of said first format from secondary sides of said bus adapter chips to respective ones of said interface modules, wherein the first means comprise means for electrically isolating the central processing unit from electrical disruption when one of the interface modules is removed.

15. The system of claim 14, wherein the bus adapter chips comprise electrical hardware which provides arbitered access along the I/O busses.

16. The system of claim 14, further including means for mounting a plurality of interface cards in interface card slots in said plurality of interface modules.

17. The system of claim 14, further including means for removably mounting said interface modules on a chassis.

* * * * *